US012607063B2

(12) United States Patent (10) Patent No.: US 12,607,063 B2
Behm et al. (45) Date of Patent: Apr. 21, 2026

(54) STEP LADDER PIVOT AND LOCK MECHANISM

(71) Applicant: Werner Co., Itasca, IL (US)

(72) Inventors: Carl William Behm, Queensland (AU); Ben Phillip Loveday, Queensland (AU)

(73) Assignee: Werner Co., Itasca, IL (US)

( * ) Notice: Subject to any disclaimer, the term of this patent is extended or adjusted under 35 U.S.C. 154(b) by 843 days.

(21) Appl. No.: 17/761,328

(22) PCT Filed: Sep. 18, 2020

(86) PCT No.: PCT/IB2020/058698
§ 371 (c)(1),
(2) Date: Mar. 17, 2022

(87) PCT Pub. No.: WO2021/053590
PCT Pub. Date: Mar. 25, 2021

(65) Prior Publication Data
US 2022/0341262 A1 Oct. 27, 2022

(30) Foreign Application Priority Data
Sep. 18, 2019 (AU) ................................ 2019903477

(51) Int. Cl.
*E06C 1/18* (2006.01)
*E06C 1/32* (2006.01)
(Continued)

(52) U.S. Cl.
CPC ................. *E06C 1/18* (2013.01); *E06C 1/32* (2013.01); *E06C 1/383* (2013.01); *E06C 7/06* (2013.01);
(Continued)

(58) Field of Classification Search
CPC ... E06C 1/18; E06C 1/32; E06C 1/383; E06C 7/06; E06C 7/50; E06C 1/393; F16C 2350/00; F16H 2035/006
See application file for complete search history.

(56) References Cited

U.S. PATENT DOCUMENTS 40,500 A * 11/1863 Philips ...................... E06C 1/32
182/124
302,066 A * 7/1884 Walker ...................... E06C 1/32
182/25
(Continued)

FOREIGN PATENT DOCUMENTS

CN 1397709 2/2003
CN 2823519 10/2006
(Continued)

OTHER PUBLICATIONS

International Search Report and Written Opinion for International Application No. PCT/IB2020/058698, date of mailing Oct. 22, 2020, 11 pages.
(Continued)

*Primary Examiner* — Brent W Herring
(74) *Attorney, Agent, or Firm* — Fitch, Even, Tabin & Flannery LLP

(57) ABSTRACT

A ladder is disclosed which has a lockable pivot arrangement. The lockable pivot arrangement is located and connected between two elongate ladder sections. Inside each pair of end housings there are at least two receptacles. A pivot mechanism connects between the end housings and the end housings rotate in unison and also allow the pair of end housings to rotate relative to the housing. A lock mechanism within the housing has at least two lock members each with an actuator and each actuator having a free end. There is an elastomeric bias element acting to bias the two lock members and respective free ends and actuators away from each
(Continued)

other, and the two actuators when biased apart are positioned so as to allow for one-handed actuation against the bias to unlock the rotation of the housing.

18 Claims, 8 Drawing Sheets

(51) Int. Cl.

| | |
|---|---|
| *E06C 1/383* | (2006.01) |
| *E06C 7/06* | (2006.01) |
| *E06C 7/50* | (2006.01) |
| *F16C 11/10* | (2006.01) |
| *F16H 35/00* | (2006.01) |

(52) U.S. Cl.
CPC ................ *E06C 7/50* (2013.01); *F16C 11/10* (2013.01); *F16H 2035/006* (2013.01)

(56) References Cited

U.S. PATENT DOCUMENTS

| | | | | |
|---|---|---|---|---|
| 510,108 | A | 12/1893 | Barr | |
| 992,051 | A | 5/1911 | Petrie | |
| 1,491,642 | A * | 4/1924 | Swain | E06C 1/32 |
| | | | | 182/201 |
| 1,746,643 | A | 2/1930 | Foss | |
| 1,894,489 | A * | 1/1933 | Hirose | E06C 1/39 |
| | | | | 182/27 |
| 1,946,747 | A | 2/1934 | Laborda | |
| 1,992,391 | A | 2/1935 | Pease | |
| 2,299,584 | A | 10/1942 | Low | |
| 2,507,396 | A | 5/1950 | Boggs | |
| 2,521,114 | A | 9/1950 | Campbell | |
| 2,596,521 | A | 5/1952 | Bell | |
| 2,823,522 | A | 2/1958 | Collins | |
| 2,962,111 | A | 11/1960 | Mckinnie | |
| 2,975,857 | A | 3/1961 | Suroff | |
| 3,016,103 | A | 1/1962 | Studer | |
| 3,208,553 | A | 9/1965 | Gray | |
| 3,811,151 | A * | 5/1974 | Kuemmerlin | E06C 1/32 |
| | | | | 403/92 |
| 4,087,885 | A | 5/1978 | Gillentine | |
| 4,100,998 | A | 7/1978 | Marquez | |
| 4,130,316 | A | 12/1978 | Rossi | |
| 4,155,422 | A | 5/1979 | Larson | |
| 4,235,449 | A | 11/1980 | Tarran | |
| 4,320,817 | A | 3/1982 | Knoke | |
| 4,403,373 | A * | 9/1983 | Kummerlin | E06C 1/32 |
| | | | | 16/326 |
| 4,440,264 | A | 4/1984 | Knoke | |
| 4,483,415 | A | 11/1984 | Disston | |
| 4,485,892 | A | 12/1984 | Maloney | |
| 4,493,392 | A | 1/1985 | Ralabate | |
| 4,574,918 | A | 3/1986 | Marques | |
| 4,645,371 | A | 2/1987 | Wang | |
| 4,666,327 | A * | 5/1987 | Su | E06C 1/32 |
| | | | | 16/329 |
| 4,842,098 | A * | 6/1989 | Yuen | E06C 1/32 |
| | | | | 182/2.4 |
| 4,967,877 | A | 11/1990 | Wallman | |
| 4,989,692 | A | 2/1991 | Min | |
| 5,052,517 | A | 10/1991 | Wallman | |
| 5,074,377 | A | 12/1991 | Krause | |
| 5,163,532 | A * | 11/1992 | McCarty | E06C 1/32 |
| | | | | 182/163 |
| 5,715,909 | A | 2/1998 | Gagnon | |
| 5,722,507 | A | 3/1998 | Kain | |
| 5,762,163 | A | 6/1998 | Kain | |
| 5,779,059 | A | 7/1998 | Kotch | |
| 5,937,968 | A | 8/1999 | Gibson | |
| 5,954,157 | A | 9/1999 | Grimes | |
| 5,992,567 | A | 11/1999 | Chiu | |
| 6,012,548 | A | 1/2000 | Kim | |

| | | | | |
|---|---|---|---|---|
| 6,026,933 | A * | 2/2000 | King | E06C 1/393 |
| | | | | 182/161 |
| 6,039,149 | A | 3/2000 | Bedja | |
| 6,343,406 | B1 * | 2/2002 | Yeh | E06C 1/32 |
| | | | | 182/163 |
| 6,347,687 | B1 | 2/2002 | Alim | |
| 6,390,238 | B1 | 5/2002 | Gibson | |
| 6,427,805 | B1 | 8/2002 | Gibson | |
| 6,443,261 | B1 | 9/2002 | Gibson | |
| 6,550,579 | B2 | 4/2003 | Gibson | |
| 6,588,547 | B2 | 7/2003 | Yeh | |
| 6,902,035 | B2 | 6/2005 | Baumgartner | |
| 6,997,282 | B1 | 2/2006 | Sharp | |
| 7,108,103 | B2 | 9/2006 | Meeker | |
| 7,140,072 | B2 | 11/2006 | Leng | |
| 7,690,316 | B2 | 4/2010 | Yoo | |
| 7,849,967 | B2 | 12/2010 | Gibson | |
| 7,857,179 | B1 | 12/2010 | Allen et al. | |
| 8,002,084 | B2 | 8/2011 | Huang | |
| 8,127,890 | B2 | 3/2012 | Meyers | |
| 8,341,806 | B2 | 1/2013 | Parker | |
| 8,381,873 | B2 | 2/2013 | Cross | |
| 8,684,139 | B2 | 4/2014 | Leng | |
| 8,997,931 | B2 | 4/2015 | Parker | |
| 9,404,305 | B1 | 8/2016 | Messick | |
| 9,488,002 | B2 | 11/2016 | Parker | |
| 9,752,334 | B2 | 9/2017 | Foley | |
| 10,435,894 | B2 | 10/2019 | Woodward | |
| 10,435,947 | B2 | 10/2019 | Parker | |
| 10,472,888 | B2 | 11/2019 | Parker | |
| 10,487,576 | B2 | 11/2019 | Ballard | |
| 10,487,580 | B2 * | 11/2019 | Miao | E05D 11/06 |
| 10,772,494 | B1 | 9/2020 | Konrad | |
| 10,975,622 | B2 | 4/2021 | Yoo | |
| 11,505,994 | B2 | 11/2022 | Foley | |
| 11,808,048 | B2 | 11/2023 | Woodward | |
| 11,846,137 | B2 | 12/2023 | Moss | |
| 2002/0017431 | A1 | 2/2002 | Gibson | |
| 2003/0057022 | A1 | 3/2003 | Leng | |
| 2003/0085074 | A1 | 5/2003 | Harmston | |
| 2004/0231920 | A1 | 11/2004 | Meeker | |
| 2004/0238280 | A1 | 12/2004 | Gibson | |
| 2005/0029050 | A1 | 2/2005 | Baumgartner | |
| 2005/0284701 | A1 | 12/2005 | Gibson | |
| 2006/0169539 | A1 | 8/2006 | Grebinoski | |
| 2007/0181369 | A1 | 8/2007 | Gibson | |
| 2008/0142301 | A1 | 6/2008 | Meyers | |
| 2008/0179138 | A1 | 7/2008 | Parker | |
| 2009/0020360 | A1 | 1/2009 | May | |
| 2009/0095567 | A1 | 4/2009 | Rinna | |
| 2009/0133959 | A1 | 5/2009 | Eriksson | |
| 2010/0071996 | A1 | 3/2010 | Huang | |
| 2011/0024234 | A1 | 2/2011 | Lin | |
| 2011/0036666 | A1 | 2/2011 | Hong | |
| 2013/0186709 | A1 | 7/2013 | White | |
| 2014/0190769 | A1 | 7/2014 | Parker | |
| 2015/0159434 | A1 | 6/2015 | Leng | |
| 2015/0211297 | A1 | 7/2015 | Parker | |
| 2017/0044827 | A1 | 2/2017 | Parker | |
| 2017/0067291 | A1 | 3/2017 | Leng | |
| 2017/0145745 | A1 | 5/2017 | Kieffer | |
| 2017/0275897 | A1 | 9/2017 | Weadward | |
| 2017/0321482 | A1 | 11/2017 | Simpson | |
| 2017/0328131 | A1 | 11/2017 | Woodward | |
| 2018/0252037 | A1 | 9/2018 | Leng | |
| 2018/0266178 | A1 | 9/2018 | Sapp | |
| 2018/0355667 | A1 | 12/2018 | Wang | |
| 2018/0363374 | A1 | 12/2018 | Woodward | |
| 2019/0376343 | A1 | 12/2019 | Maxfield | |
| 2019/0383099 | A1 | 12/2019 | Yeh | |
| 2020/0032530 | A1 | 1/2020 | Woodward | |
| 2020/0080376 | A1 | 3/2020 | Parker | |
| 2020/0291722 | A1 * | 9/2020 | Barchine | E06C 1/383 |
| 2022/0025704 | A1 | 1/2022 | Bibler | |
| 2025/0084699 | A1 | 3/2025 | Chen | |

(56) References Cited

U.S. PATENT DOCUMENTS

| | | | |
|---|---|---|---|
| 2025/0101805 | A1 | 3/2025 | Papa |
| 2025/0207463 | A1 | 6/2025 | Chen |

FOREIGN PATENT DOCUMENTS

| | | | |
|---|---|---|---|
| CN | 2823522 | Y | 10/2006 |
| CN | 2908669 | | 6/2007 |
| CN | 201144627 | Y | 11/2008 |
| CN | 101338649 | A | 1/2009 |
| CN | 101864890 | | 10/2010 |
| CN | 101338649 | B | 2/2011 |
| CN | 202348099 | | 7/2012 |
| CN | 202767864 | U | 3/2013 |
| CN | 203925264 | | 11/2014 |
| CN | 204609748 | | 9/2015 |
| CN | 105008652 | | 10/2015 |
| CN | 107250479 | | 10/2017 |
| CN | 206668013 | U | 11/2017 |
| CN | 107724943 | A | 2/2018 |
| CN | 108798480 | | 11/2018 |
| CN | 109154172 | | 1/2019 |
| CN | 110306923 | | 10/2019 |
| CN | 110344747 | | 10/2019 |
| CN | 210685838 | | 6/2020 |
| CN | 113969748 | | 1/2022 |
| CN | 217028761 | U | 7/2022 |
| DE | 2741091 | | 3/1979 |
| DE | 3027240 | A1 | 2/1982 |
| DE | 9402746 | | 6/1995 |
| DE | 10008174 | | 4/2001 |
| EP | 1921249 | | 5/2008 |
| EP | 2000612 | | 12/2008 |
| EP | 2090740 | | 8/2009 |
| EP | 2845987 | | 3/2015 |
| EP | 3260646 | | 12/2017 |
| EP | 4031742 | | 7/2022 |
| FR | 2319003 | A1 | 2/1977 |
| FR | 2715187 | | 7/1995 |
| FR | 2832608 | | 5/2003 |
| GB | 769002 | | 2/1957 |
| GB | 863900 | | 3/1961 |
| GB | 2152125 | A | 7/1985 |
| GB | 2322897 | A | 9/1998 |
| JP | S4115401 | Y | 7/1966 |
| JP | S54134632 | U | 9/1979 |
| JP | S57194600 | U | 12/1982 |
| JP | 3030253 | B2 | 4/2000 |
| JP | 2002201794 | A | 7/2002 |
| JP | 2004011126 | | 1/2004 |
| JP | 2006299731 | A | 11/2006 |
| JP | 2008528834 | A | 7/2008 |
| JP | 2013072174 | | 4/2013 |
| TW | M620750 | U | 12/2021 |
| WO | 2006106494 | A1 | 10/2006 |
| WO | 2021053590 | A1 | 3/2021 |
| WO | 2021168242 | A1 | 8/2021 |

OTHER PUBLICATIONS

Extended European Search Report issued in App. No. EP20866566. 1, dated Aug. 14, 2023, 7 pages.

International Preliminary Report on Patentability issued in App. No. PCT/IB2020/058698, issued Mar. 15, 2022, 7 pages.

International Search Report and Written Opinion issued in App. No. PCT/US2023/036498, mailing date Feb. 22, 2024, 9 pages.

Little Giant, A-Force 300 Ladder specification sheet, product believed to be publicly available as early as Sep. 25, 2023, 6 pp.

Patent Cooperation Treaty, International Searching Authority, Notification of Transmittal of the International Search Report and the Written Opinion of the International Searching Authority, or the Declaration, issued in International Application No. PCT/US2023/012018, May 24, 2023, 13 pp.

U.S. Appl. No. 18/890,135, filed Sep. 19, 2024.

USPTO; U.S. Appl. No. 16/678,670; Final Rejection mailed Dec. 21, 2023; (pp. 1-12).

USPTO; U.S. Appl. No. 16/678,670; Office Action mailed Apr. 1, 2024; (pp. 1-15).

Werner, "AP-20 Aluminum Work Platform Type II", (Feb. 15, 2016), pp. 1-2, URL: https://web.archive.org/web/2016-02-27053413/http://www.wernerco.com/us/en/view/Products/ClimbingEquipment/Portable Scaffold/AP/AP-20.

Werner, "AP-20-MP6Work Platform", (Jan. 2005), pp. 1-2, URL: http://www.wernerco.com/ docs/us/userguides/ap-20.pdf?Status=Master&sfvrsn=2.

KIPO; Office Action issued in KR Application No. 10-2022-7012913, dated Feb. 27, 2026 with English translation (18 pages).

* cited by examiner

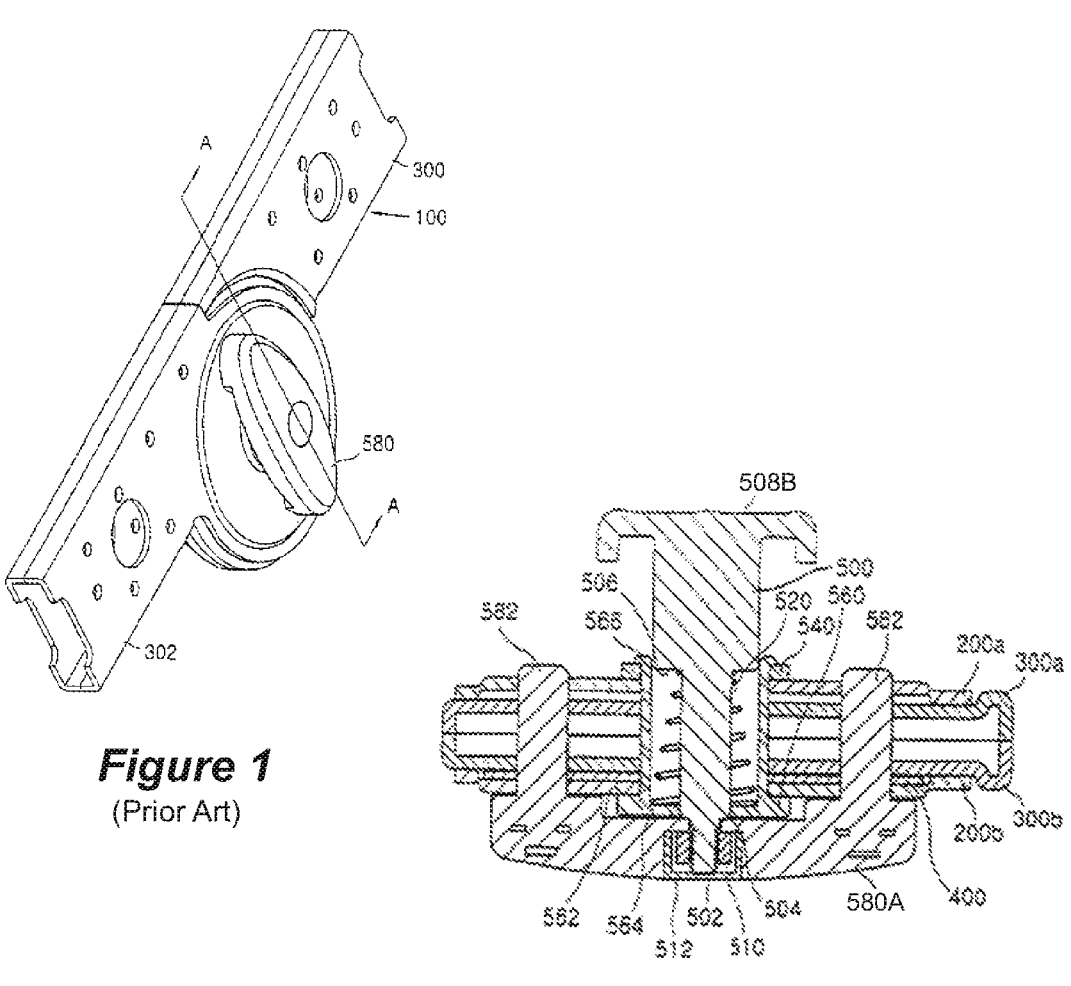
Figure 1
(Prior Art)
Figure 2
(Prior Art)
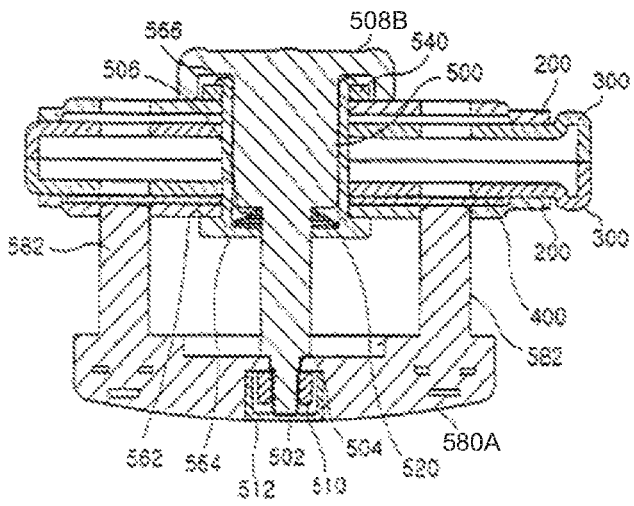
Figure 3
(Prior Art)

STEP LADDER PIVOT AND LOCK MECHANISM

CROSS-REFERENCE TO RELATED APPLICATION(S)

This application is a National Stage application of International Application No. PCT/IB2020/058698, filed on 18 Sep. 2020, and published as WO 2021/053590 A1. on 25 Mar. 2021, and claims priority to Australian Provisional Patent application Ser. No. 20/199,03477 filed on 18 Sep. 2019. The contents of which are hereby incorporated by reference in their entireties.

FIELD

The field of the disclosure is ladders and in particular a device for pivoting and locking elongate ladder sections to facilitate the set-up of a ladder for use and for storage.

BACKGROUND

In the following discussion, certain articles and methods will be described for background and introductory purposes. Nothing contained herein is to be construed as an "admission" of the prior art. The applicant expressly reserves the right to demonstrate, where appropriate, that the articles and methods referenced herein do not constitute prior art under the applicable statutory provisions.

Pivots located between sections of ladders that allow movement of the sections relative to the other are well known. This feature is generally used to allow the ladder to be folded for storage, but in more recent arrangements, the articulation and manual fixing of the angle of articulation of sections, allows a single ladder to be configured to suit a large variety of shapes and extension capabilities.

It is known that to lock the relative position of a pivoted section of a folding ladder it is possible to selectively move a part through a portion of the pivot to prevent the pivot rotating and thus locking into place the relative position of the two sections. FIGS. 1 to 4 depicts an example of such a pivot locking arrangement, which is certainly not the only arrangement suitable for individually locking the relative position of two pivoted sections with respect to the other.

FIGS. 1 to 4 (PRIOR ART) depict a pivot for allowing two sections 300 and 302 of a ladder (not shown) to move relative to the other. The pivot depicted in FIG. 1 depicts a release and locking member 580A which needs to be forced outward by, in this arrangement, the push of the locking member 508B from the opposite side of the pivot, as depicted in FIGS. 2 and 3 (PRIOR ART). The push provided on to the locking member 508B is against a bias (spring 520), and the movement of the locking members is transverse to the axis of rotation of the pivot. Once the locking member 580A is clear of apertures through the pivot, the pivot is freely rotatable and thus operable to rotate and allow the sections to be rotated relative to each other. The pushing force against the bias on locking member 508B is maintained until the pivot is rotated to a position which allows the locking member 580A to re-enter the pivot and through predetermined apertures. Once that re-entry is possible, since the locking member 580A aligns with two of those predetermined apertures, the bias force assists in pulling the locking member 580A into those apertures, thus preventing the pivot from rotating and thus locking the operation of the pivot. The pivot and reciprocating locking members 580A and 502B operated by a hand of the user allow the angle between the sections 300 and 302 to be adjusted to different pre-set angles defined by the position of the predetermined apertures.

In use, the type of lockable pivot arrangement disclosed above, allows the sections of a ladder to fold for storage, and also rotate to extend the ladder for use when the lockable pivot is used on each of two side rail members, as depicted in FIGS. 4A and 4B (PRIOR ART). It is apparent that the user must use one hand for the operation of one pivot locking arrangement on one side of the ladder, and the other hand for the operation of another pivot locking arrangement on the other side of the ladder. Thus, the unlocking and re-locking of the pivot locking arrangements must be coordinated using two hands at the same time. Otherwise, the two sections 400 and 402 cannot be rotated relative to each other.

Mechanical and constructional details of the pivot described and disclosed in FIG. 5 include an external frame 200 including a centre aperture 206 and a pair of locking apertures 204. There is an inner frame 300 rotatable with the external frame which includes a centre aperture 306 and pairs of locking apertures 404. There is a rotary plate 400 rotatably disposed between the frames and having locking apertures 304, and a substantially flat rotary spring 410 having one end mounted to the inner frame 300 and an opposite end mounted to the rotary plate 400. There is a hub member 560 rotatably connecting the frames about the centre apertures (206 and 306), and includes a hub member locking end 564 at one side (the unlocking end 566 locked with a locking ring 540). There is also a locking part for extension into the locking apertures (204 and 304) to fix an angle of the frames relative to each other. There is a press axle 500 connected with the locking part, passing through the hub member 560, and including a bearing end 506; and a spring 520 positioned between the hub member 550 locking end 564 and the bearing end of the press axle 500. The working principle of this example prior art arrangement is to controllably make the pivot fixable between the relatively moving parts immovable or moveable by operating the lockable pivot with one hand, but two hands are required when this example pivot is used on each side of the same ladder.

In other arrangements where a locking arrangement is desired to fix two sections of a ladder which can move relative to the other, manually operable side hooks or side-arms mounted to both sections of the same ladder are arranged to position a pin into a suitable aperture in the other section of the ladder but not the pivot. Such an arrangement maintains the relative positions of the two pivoted sections; otherwise the pivot would remain free to rotate. The operation of the side hooks or side-arms requires the use of two hands at the same time and good hand-eye coordination.

The prior arrangements to lock and unlock pivoted sections of ladders require good hand-eye coordination and two hands to operate to unlock and lock the rotation of those sections to set the ladder into alternative positions for storage and use.

BRIEF SUMMARY DESCRIPTION OF ASPECTS OF THE DISCLOSURE

This Summary is provided to introduce a selection of concepts in a simplified form that is further described below in the Detailed Description. This Summary is not intended to identify key or essential features of the claimed subject matter, nor is it intended to be used to limit the scope of the claimed subject matter. Other features, details, utilities, and advantages of the claimed subject matter will be apparent from the following written Detailed Description, including those aspects illustrated in the accompanying drawings and defined in the appended claims.

In an aspect, there is a lockable pivot arrangement for a ladder having two elongate ladder sections with at least one step in each section, the lockable pivot arrangement located and connected between the two elongate ladder sections. The lockable pivot arrangement comprises: a housing connected to a first of the two elongate sections; a pair of end housings connected to a second of the two elongate ladder sections, having at least two receptacles located inside each of the end housings; a pivot mechanism which connects between the end housings so the end housings rotate in unison and also allows the pair of end housings to rotate relative to the housing; and a lock mechanism retained within the housing and having at least two lock members each with an actuator and each actuator having a free end. There is an elastomeric bias element acting to bias the two lock members and respective free ends and actuators away from each other, and the two actuators when biased apart are positioned so as to allow for one-handed actuation against the bias, wherein locking the rotation of the housing and the pair of end housings is provided when the free ends of the lock members enter a respective receptacle located inside a respective end housing, and wherein unlocking the rotation of the housing and the pair of end housings is provided when each end of the sliding lock mechanism is actuated by a respective actuator against the bias to move the pair of ends towards each other so the free ends exit the receptacle located inside a respective end housing to allow rotation of a connected respective elongate ladder section.

In an aspect there is A ladder comprising a first elongate ladder section having at least one step and a second elongate ladder section having at least one step and including a lockable pivot arrangement as disclosed in an aspect above connected to the first elongate ladder section and second elongate ladder section, about which the connected first elongate ladder section and connected second elongate ladder section of the step ladder move between an open state, where the first and second elongate ladder sections are adjustable into an angular relationship and also adjustable into a folded state where the first and second elongate ladder sections are substantially parallel to each other.

It will be appreciated by those skilled in the art that the disclosure described herein is not restricted in its use to the particular application described. Neither is the disclosure restricted in its preferred embodiment with regard to the particular elements and features described or depicted herein. It will be appreciated that the scope of the disclosure is not limited to the embodiment or embodiments disclosed, but is capable of numerous rearrangements, modifications, and substitutions without departing from the scope as set forth and defined by the claims.

It will be appreciated by those skilled in the art that the embodiments are not restricted in its use to the particular application described. Neither are the presented embodiments restricted in their embodiments with regard to the particular elements and features described or depicted herein. It will be appreciated that various modifications can be made without departing from the principles disclosed. Therefore, the embodiments should be understood to include all such modifications within their scope.

The prior summary is provided to introduce a selection of concepts in a simplified form that is further described below in the Detailed Description of Embodiments. That summary is not intended to identify key features or essential features of the claimed subject matter.

BRIEF DESCRIPTION OF THE FIGURES

FIG. 1 depicts a lockable pivot arrangement (PRIOR ART);

FIG. 2 depicts a section view A-A through the lockable pivot arrangement of FIG. 1 in a locked configuration (PRIOR ART);

FIG. 3 depicts a section view A-A through the lockable pivot arrangement of FIG. 1 in an un-locked configuration (PRIOR ART);

DETAILED DESCRIPTION OF EMBODIMENTS

As used in the specification and claims, the singular form "a", "an" and "the" include plural references unless the context dictates otherwise.

The present disclosure may use the term "comprise" (open-ended) or "consist essentially of" in relation to components of the present disclosure as well as other methods or elements described herein. As used herein, "comprising" means the elements recited, or their equivalent in structure or function, plus any other element or elements which are not recited. The terms "having" and "including" are also to be construed as open-ended unless the context suggests otherwise. As used herein, "consisting essentially of" means, that the claimed arrangement, method and system may include ingredients in addition to those recited in the claim, but only if the additional ingredients do not materially alter the basic and novel characteristics as claimed.

Where used herein, the term "and/or" when used in a list of two or more items means that any one of the listed characteristics can be present, or any combination of two or more of the listed characteristics can be present. For example, if a step is described as containing characteristics A, B, and/or C, the step can contain A feature alone; B alone; C alone; A and B in combination; A and C in combination; B and C in combination; or A, B, and C in combination.

This disclosure includes various embodiments of a single hand-operated lockable pivot arrangement (release and assisted re-engagement) that allows for products with articulating sections to be configured into multiple predetermined different articulated positions quickly and safely.

Figures 4A, 4B, 5:
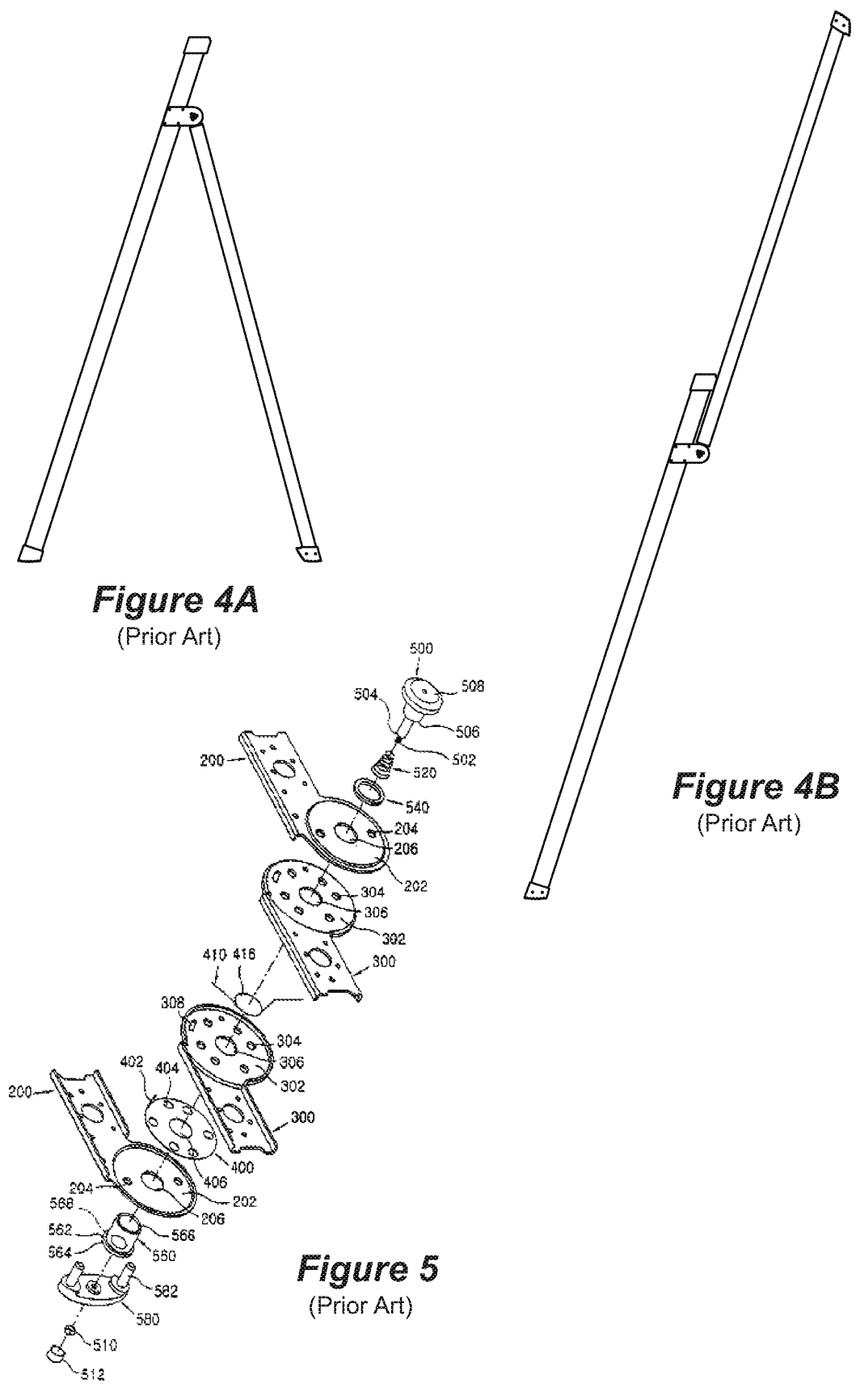
FIG. 4A depicts a step ladder with a lockable pivot arrangement of FIG. 1 in a folded condition (PRIOR ART)
FIG. 4B depicts a step ladder with a lockable pivot arrangement of FIG. 1 in an un-folded condition (PRIOR ART)
FIG. 5 depicts an exploded view of the parts of the unlock and lock pivot arrangement of FIG. 1 (PRIOR ART)
Figures 6A, 6B:
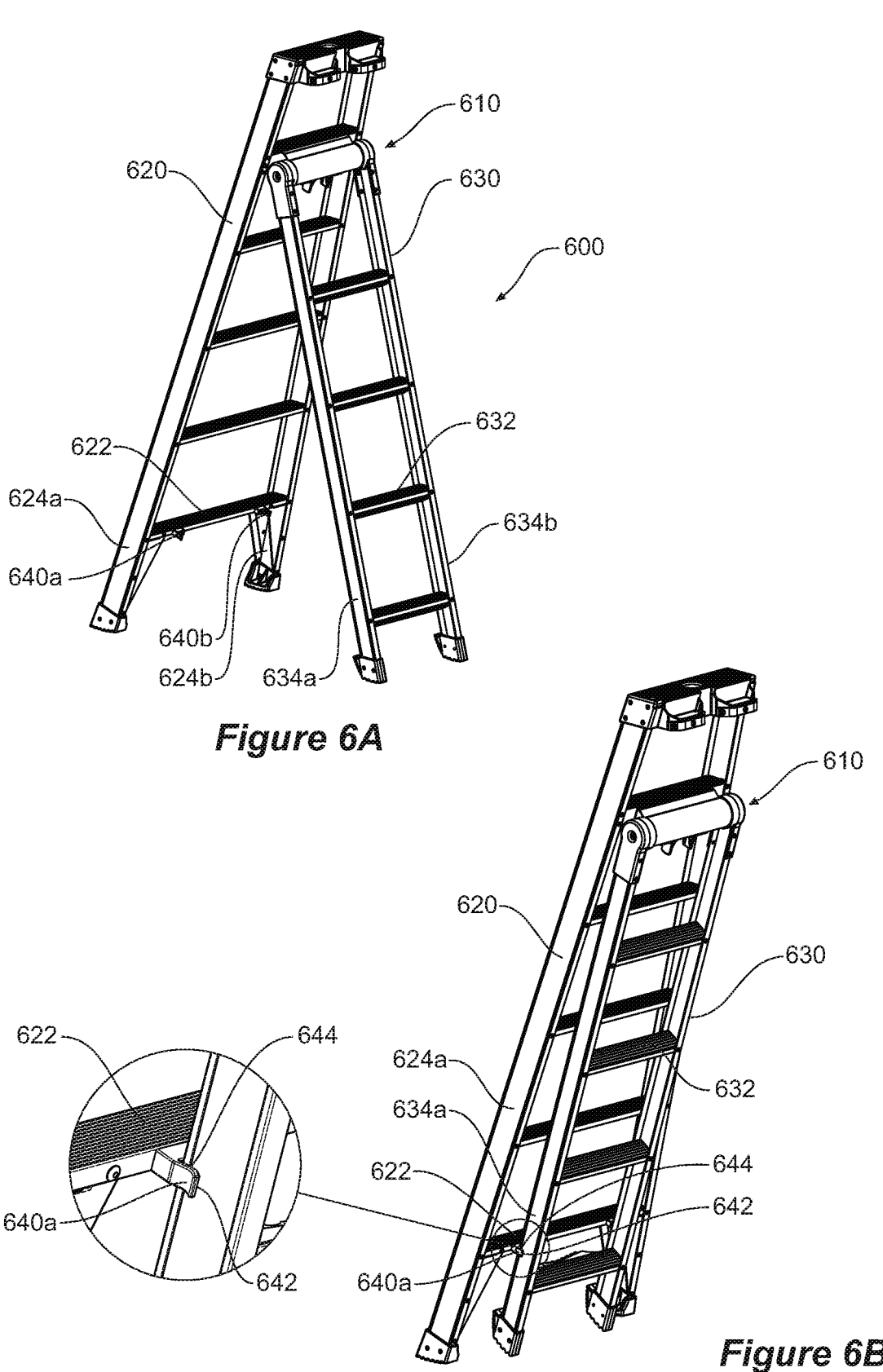
FIG. 6A depicts an exemplary step ladder having an embodiment of a single hand-operated unlock and lock pivot arrangement connected to both a first elongate ladder section and a second elongate ladder section of a ladder in an in use state.
FIG. 6B depicts an exemplary step ladder having an embodiment of a single hand-operated unlock and lock pivot arrangement connected to both a first elongate ladder section and a second elongate ladder section of a ladder in an in use folded state.

By way of non-limiting example, as depicted in FIG. 6A a step ladder embodiment 600 illustrates a use for single hand-operating unlock and lock (release and assisted re-engagement) lockable pivot arrangement 610 to connect sections of the step ladder. The step ladder includes a first elongate section 620, having at least one step 622. The step ladder also includes a second elongate ladder section 630 having a least one step 632. The step ladder may include a platform (not shown) connected between the first and second sections or connected to either one of the sections to provide a flat horizontal work surface larger than the surface of a step at a height which will be fixed when the platform is in use, otherwise the platform is located out of the way for storage and while the step ladder is in use without a usable platform. Each section has 2 stiles (624a, 624b and 634a, 634b) and one or more steps 622 and 632 (sometimes referred to as treads or rungs) fixed between the stiles and spaced along the stiles at a distance suitable for a human to step up and down while using the ladder. Step ladders generally only have one or two steps, but there can be more steps. The length of one or both of the stiles may be adjustable, but not illustrated in this arrangement by the sliding interaction of sets of stiles. The platform is in an embodiment connected to the first and second sections wherein the first and second elongate ladder sections are adjustable into an angular relationship and the platform is adjustable into a substantially horizontal orientation for use. There is also a folded state where the first and second elongate ladder sections and the platform are substantially parallel to each other.

FIG. 6B depicts an exemplary step ladder having an embodiment of a single hand-operated pivot arrangement 610 connected to both a first elongate ladder section and a second elongate ladder section of a ladder and is shown in a folded state suitable for transportation and storage of the folded ladder. The single hand-operating unlock and lock (release and assisted re-engagement) lockable pivot arrangement is operable as will be described to allow the two elongate ladder sections to rotate relative to one another. As depicted in FIG. 6B both a first elongate ladder section 620 and a second elongate ladder section 630 of the ladder are shown parallel to one another. Tab 640a extends outward of the inside of the lowest most step 622. The tab is shaped to allow the inside edge of the stile 634a of the second elongate ladder section 630 to slide over the leading surface 642 of the tab as the tab flexes to allow the passing of the stile. The inside edge of the stile is then retained in the groove 644 of the tab. By way of example, the tab is made of a resilient bendable material, such as metal plate or suitable plastic so that it can flex when the inside edge of the stile 634a slides into and out of the groove. Another like tab 640b extends outward of the inside of the lowest most step 622 on the opposite side of the step so as to receive and retain the inside edge of the stile 634b of the second elongate ladder section 630. The tabs are used to retain the first elongate ladder section 620 and a second elongate ladder section 630 of the ladder parallel to one another, since the lockable pivot arrangement may not lock in that position. It is an embodiment for that lockable pivot arrangement to lock in the described position but it is a matter of convenience for the two elongate ladder sections to easily rotate relative to one another without having to unlock the lockable pivot arrangement.

Figures 6C, 7:
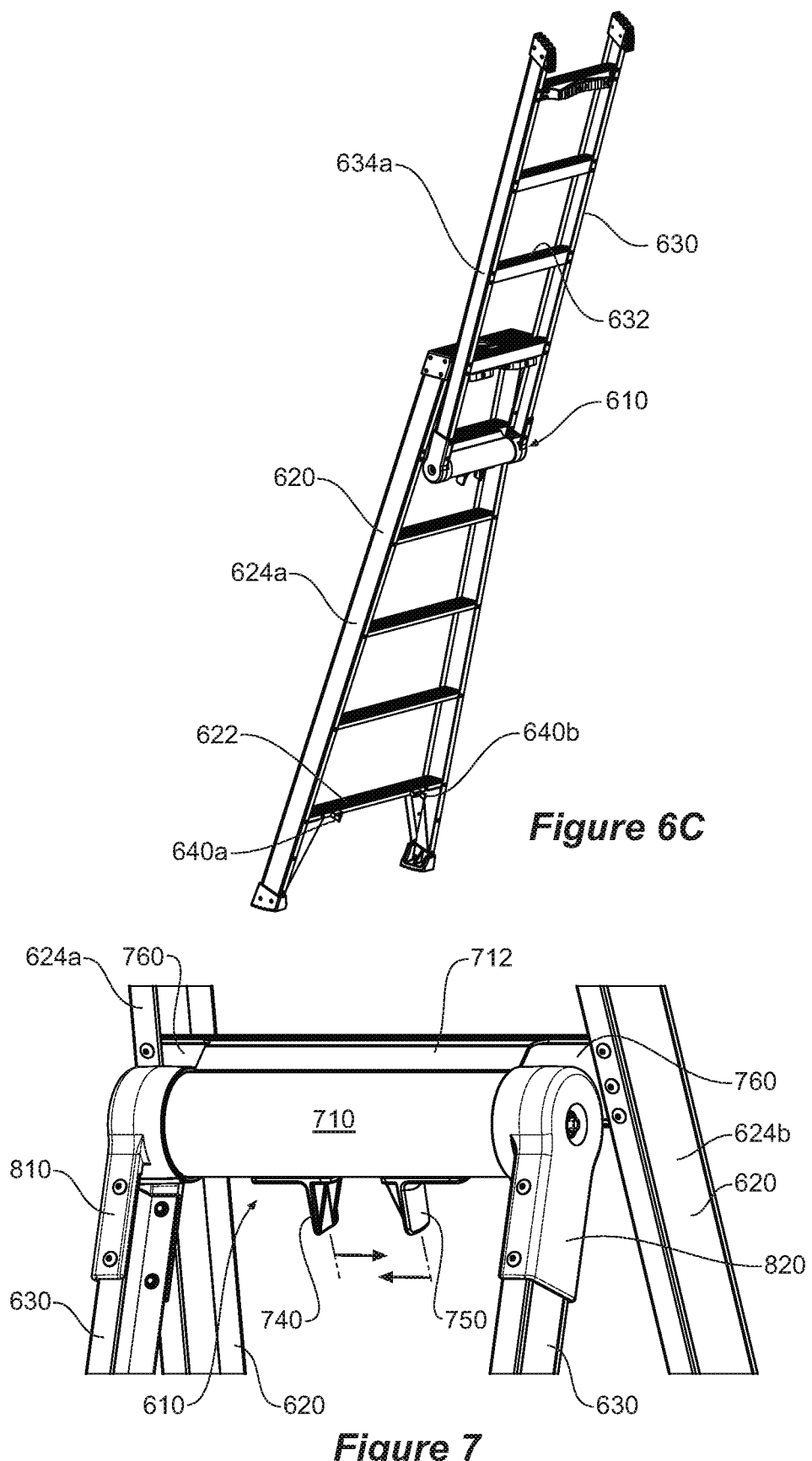
FIG. 6C depicts an exemplary step ladder having an embodiment of a single hand-operated unlock and lock pivot arrangement connected to both a first elongate ladder section and a second elongate ladder section of a ladder in an extended state.
FIG. 7 depicts a perspective rear view of a portion of a step ladder with an embodiment of a single hand-operated unlock and lock pivot arrangement connected both to a first elongate ladder section and a second elongate ladder section of the step ladder.

FIG. 6C depicts an exemplary step ladder having an embodiment of a single hand-operated pivot arrangement 610 connected to both a first elongate ladder section and a second elongate ladder section of a ladder in an extended state. The single hand-operating unlock and lock (release and assisted re-engagement) lockable pivot arrangement is operable as will be described to allow the two elongate sections to rotate relative to one another. As shown in FIG. 6C both a first elongate ladder section 620 and a second elongate ladder section 630 of the ladder are shown parallel to one another but each elongate ladder section is off-set such that the steps 632 of elongate ladder section 630 are located (in this depiction) above and beyond the steps 622 of the elongate ladder section 620. The retention of the position of the first elongate ladder section 620 relative to the second elongate ladder section 630 of the ladder is achieved by the lockable pivot arrangement providing a locked state in that position. There can be a further retention arrangement to supplement the action of the lockable pivot arrangement.

The embodiment disclosed is a step ladder 600 and includes a lockable pivot arrangement 610 connecting the first elongate ladder section to a second elongate ladder section, about which the first elongate ladder section and second elongate ladder section move between an open state, where the first and second elongate ladder sections are in an angular relationship for use as depicted in FIG. 6A, and a folded state where the first and second sections and the platform are parallel as depicted in FIG. 6B and a parallel and extended state as depicted in FIG. 6C.

An external perspective view of the lockable pivot arrangement 610 is depicted in FIG. 7 and comprises a housing 710 which is mostly cylindrical attached to a portion 712 of the brace 760 along its length. The cylindrical housing 710 is connectable and connected to portion 712 of the brace 760 or directly to section 620 of the step ladder 600. In this embodiment there is a brace 760 between stiles 624a and 624b and the protruding portion 712 is connected to the brace. Many forms of connection are possible and bolts and nuts (not shown) being one such form. Other forms could include rivets, screws, and even welding. When a connection between parts is required as disclosed herein, the preceding and other forms of connection will be available with the suitability or otherwise of the connection being a matter of design and engineering choice. The housing 710 could also be connectable between the stiles (not shown).

The housing 710 is hollow so that it can house a sliding lock arrangement. Only a portion of the hand-operated actuators 740 and 750 are internal of housing 710, while the majority of the actuators are external of the housing. The housing also encases an arrangement of elements that permit the actuators to slide (the arrows illustrate inward movement). The sliding of the actuators 740 and 750 along and in a respective slot 742 and 752 (FIG. 12) in the housing and parallel to a rod 800 positioned coaxially of the cylindrical housing 710. Each actuator is attached to a respective sliding lock element 1210 and 1220 (see FIGS. 8 and 9 and FIG. 12). The sliding lock members are biased away from the other by an elastomeric bias element 1230, in this embodiment a spring (FIG. 12), so that the attached actuators are forced outwards along with the sliding lock members relative to the longitudinal axis of the cylindrical housing. Thus the actuators are positioned apart from each other when not being operated and ready to be brought together against the bias provided by the elastomeric bias element. The sliding lock mechanism, consisting in this embodiment of two sliding lock members 1210 and 1220, but there could be more, each of the two in this embodiment having free ends 1210a and 1220a (FIG. 11), and an elastomeric bias element 1230 acting to bias the pair of ends apart. When forced apart by the bias the free ends engage with at least one of the receptacles 1600 (FIG. 16) which in this embodiment are slots, but the receptacles could be of other shapes formed in the end housing, or a receptacle could be a mechanism, which for example allows for the insertion and extraction (or active encasement) of the free end of the lock mechanism. The receptacles are located inside a respective end housing 810 and 820 (FIGS. 7, 8, 9, 10 and 15) by forming walls which are sized to permit the movement of the free ends into and out of the space created by the walls. Once the free end of a respective sliding lock mechanism is located in a respective receptacle, the sliding lock mechanism is rotationally locked, such that rotation of the respective connected ladder sections is simultaneous. The embodiment disclosed is one example of a clutch-dog arrangement wherein the two otherwise rotating parts are coupled by interference such that once coupled when one part rotates the other part also rotates at the same speed and without slip and in the locking mechanism the two parts are locked together.

When the actuators 740 and 750 are squeezed generally between the thumb and pointer finger of one hand against the bias force, the respective sliding lock elements 1210 and 1220 are drawn along with the actuators also towards each other and the free ends of the sliding lock members become disengaged from receptacles 1600 in the respective end housing. The sliding lock mechanism is thus actuated by a respective actuator against the bias to move the pair of free ends 1210a and 1220a to disengage with a respective at least one of the receptacles 1600 located inside the end housing 810 or 820. Once the free ends 1210a and 1220a of the sliding lock members have been fully removed from the respective receptacle, there is an allowance of the relative rotation between the housing 710 and the pair of end housings and the respectively connected ladder sections.

Figure 9:
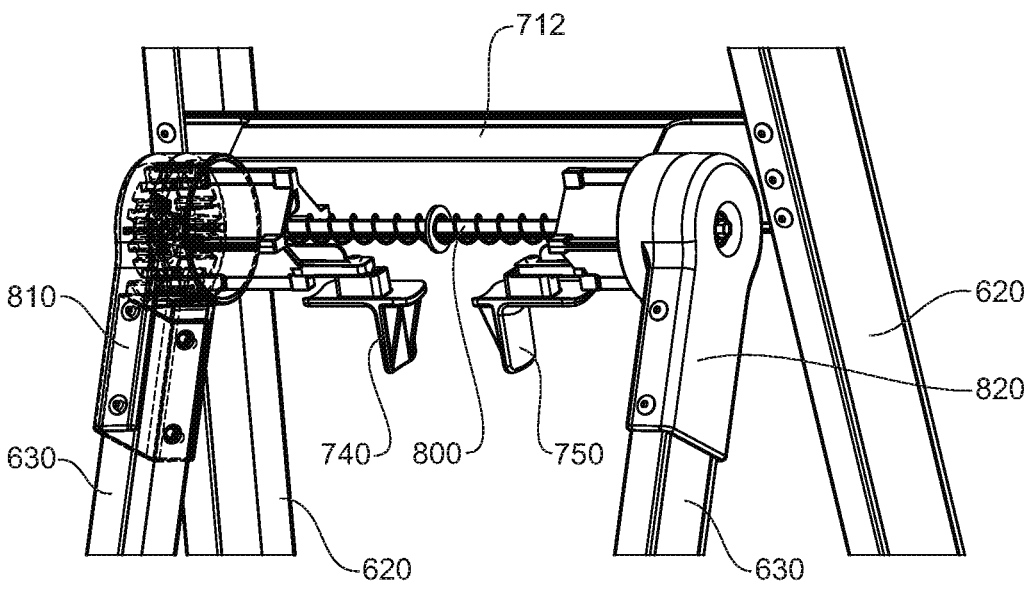
FIG. 9 depicts a partial perspective rear view of a step ladder with a unlock and lock pivot arrangement of the embodiment of FIG. 7 partially exposed and illustrating a transparent cover exposing one side of the pivot and lock mechanisms.
Figure 10:
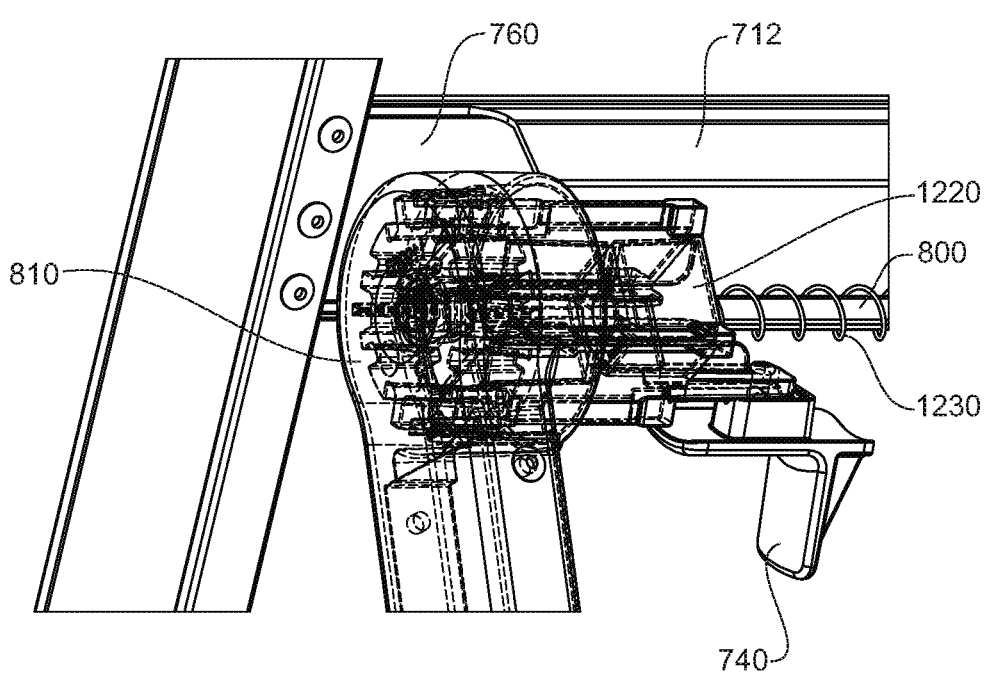
FIG. 10 depicts a partial perspective front side view of a step ladder with a unlock and lock pivot arrangement of the embodiment of FIG. 7 illustrating a transparent end housing exposing the lock mechanism in an unlocked condition.
Figure 11:
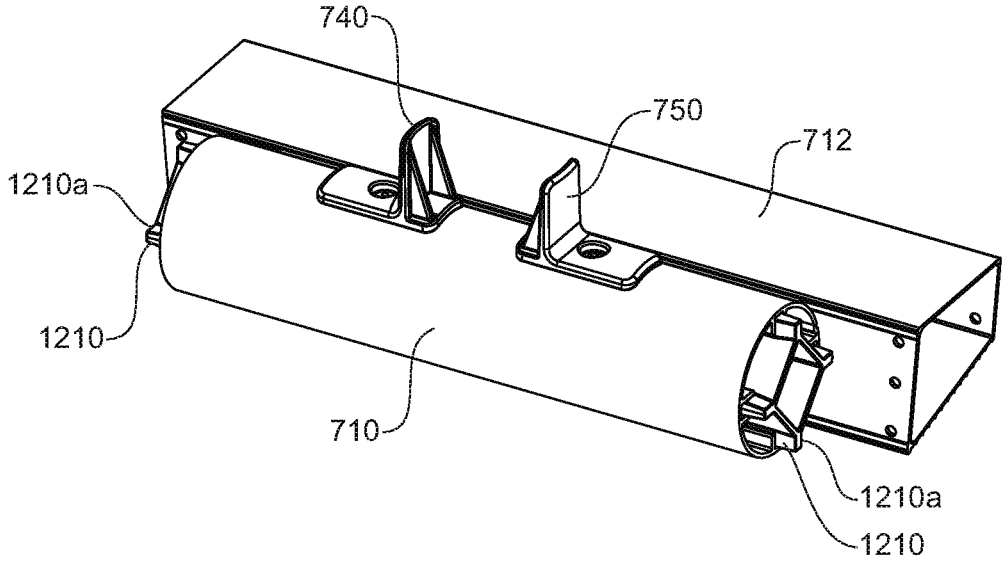
FIG. 11 depicts an assembled version of the housing which retains the single hand-operated unlock and lock (release and engage) mechanism without showing the pivot mechanism along which the lock mechanism slides.

FIGS. 9 and 10 depict a partial perspective rear view of a step ladder with a lockable pivot arrangement of the embodiment of FIG. 7 and using the illusion of a transparent end housing 810 the receptacle of the end housing is revealed. There are two end housings 810, and 820 and one function of the end housing is to be connectable to a respective stile 634a and 634b of the elongate ladder section 630. That connection is shown as being pop-rivets, but many other fixings as discussed may also be suitable.

Figure 16:
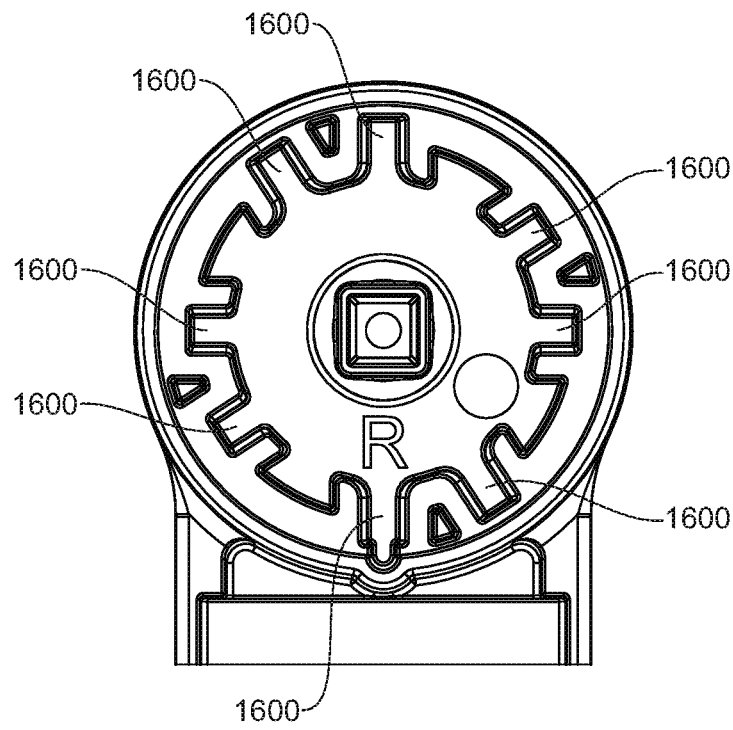
FIG. 16 depicts an inside end view of an end housing.

The lockable pivot mechanism provides for the rotation of each end housing 810 and 820 in together with respect to the housing 710. That rotation in unison of the end housings is achieved by the use and positioning of a rod 800 (FIG. 8) between the centres of each of the end housings. FIG. 16 depicts an inside end view of an end housing showing a square aperture into which a square end of the rod is inserted. This ensures that both end housings rotate at the same time and in the same direction relative to the housing 710.

Figure 8:
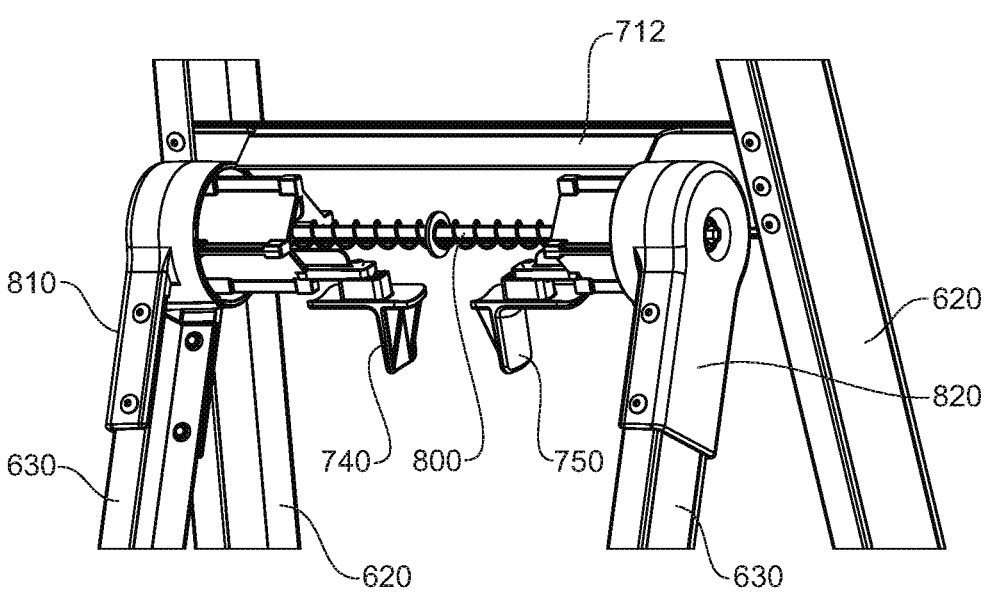
FIG. 8 depicts a partial perspective rear view of a step ladder with the unlock and lock pivot arrangement of the embodiment of FIG. 7 partially exposed.
Figures 12, 13, 14:
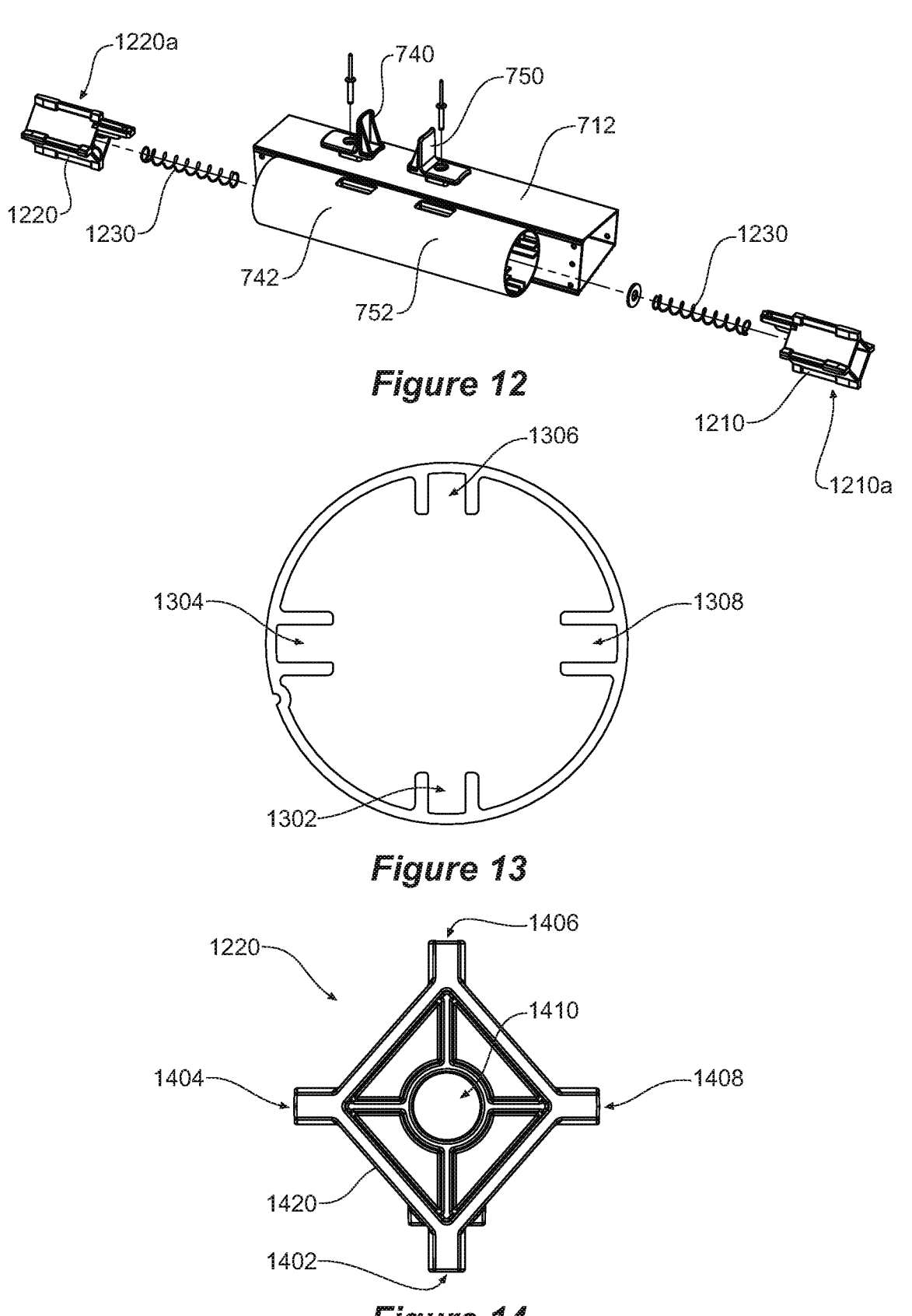
FIG. 12 depicts an exploded view of the housing which retains the single hand-operated unlock and lock mechanism depicted in FIG. 11.
FIG. 13 depicts a cross-section of the housing of the single hand-operated unlock and lock pivot arrangement of embodiment of FIGS. 6A, 6B and 6C.
FIG. 14 depicts an end view of a lock member.

An additional function of the rod 800 is to support the sliding lock elements 1210 and 1220 which conveniently slide along the cylindrical portion of the rod between its ends. FIG. 14 depicts an end view of a sliding lock member, and central to the sliding lock member is an aperture 1410 through which the rod passes, which is circular intermediate the squared ends of the rod. The rod is not depicted in FIG. 12 but is shown in FIGS. 8, 9 and 10.

Figure 15:
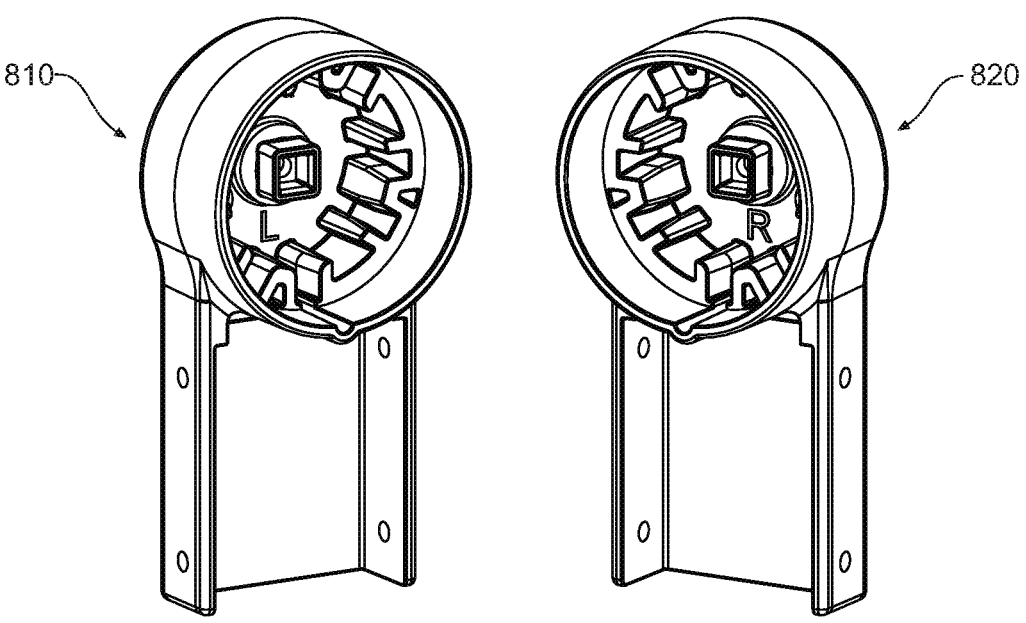
FIG. 15 depicts two end housings, each of which are connected to the end of a respective section of the step ladder.

FIG. 10 best illustrates the provision of a plurality of receptacles 1600 which are sized to permit the free end (1210a or 1220a) of a sliding lock element (1210 or 1220) to slide into and out of the respective receptacle. FIG. 10 also depicts a partial perspective rear side view exposing the inside of end housing 810 arrangement and the radial array of receptacles. While FIGS. 15 and 16 depict an inside end view of an end housing and illustrate, by way of example, only in FIG. 16, that there are eight receptacles 1600, radially arrayed at the inner end of the end housing. The receptacles do not extend the full depth of the end housing and that allows the housing 710 to slide into the outer portion of the end housing and to rotate therein as the pivot function is performed allowing movement of the connected elongate ladder sections 620 and 630. The strength of the inserted part is the most critical since the strength of the receptacle part is assisted by the one-piece form of the receptacle part in this embodiment.

In the embodiment disclosed the free ends 1210a and 1220a of the sliding lock elements 1210 and 1220 are sized the same as the rest of the sliding lock element since this maintains the strength of the element, which is also coupled into the housing 710, which also rotates along with the connected ladder section 620. The material used for construction of most of the lockable pivot arrangement is UV resistant Polyoxymethylene (Acetal) as this material is light, hard, ridged, low friction, has dimensional stability and is of the required strength. This material supplied in pellet form is heated and can be formed into the relevant shapes using known two part die injection and blow moulding techniques, as well extrusion and rotational moulding are also possible and other materials may also be suitable as long as they meet strength and durability requirements. The spring is made of spring steel. The various connection and fixing elements are corrosion resistant metals, as disclosed previously and are generally used to fix plastic to plastic or plastic to aluminium portions of the ladder having the required sheer and tensile strength to ensure a long term safe fixing of the various components of the lockable pivot arrangement and ladder.

Each sliding lock element 1210 and 1220 as depicted in FIGS. 8, 9, 10, 12 and the end view of a sliding lock element 1220 in FIG. 14 is shaped to be simultaneously slid into four receptacles 1600 of the end housings 810 and 820. FIG. 14 best depicts the four ridges 1402, 1404, 1406 and 1408 on the apexes of a substantially square cross-section elongate body 1420, where the four ridges are at 90 degrees to each other about the central longitudinal axis of the body of the sliding lock element. The four ridges not only slide into the receptacles of the end housings but also slide along channels 1302, 1304, 1306 and 1308 provided on the inside of the housing 710 as depicted in FIG. 13, which depicts a cross-section of the cylindrical housing 710. Again, the strength of the inserted part is the most critical since the strength of the receptacle part is assisted by the one-piece form of the receptacle part in this embodiment.

There is a connection between the housing 710, in the illustrated embodiment and section 620, which in this embodiment is connected via a brace 760 between stiles 634*a* and 634*b*. Thus the housing and associated lockable pivot arrangement along with the connection bears the full force of the upper end of the elongate ladder section 630 against elongate ladder section 620. The forces vary according to the relative angle of the elongate ladder sections 620 and 630 to each other, which is set by the lockable pivot arrangement. Since the connection between those sections may only be through the housing (however additional bracing may be useable between the elongate ladder sections 620 and 630 to prevent them separating any further than set by the lockable pivot arrangement), it is necessary for the connection between the housing and section 620 to be strong enough to support the forces involved. Those forces will involve, first supporting the step ladder frames, but more importantly the support of a person or two persons using the step ladder plus any required safety factor regarding the dead and live loading of the ladder. Despite warnings and recommended procedures, if both persons are located on the step ladder above the locked pivot arrangement, it is desirable that the lockable pivot arrangement and the respective connections to the sections of the ladder are strong enough to support the load involved.

It may also be possible for the pivot to allow the elongate ladder sections 620 and 630 to be rotated so that they are parallel, such that one section lies above the other section, so as to make the step ladder into an extension ladder of a height almost double the height of the other section. In that situation, the forces involved are different but still considerable, and the strength of the connection and all the elements that deal with the forces involved need to be accounted for in the materials used, the environmental conditions, the stresses over time and many other characteristics typically dictated by standards.

The embodiment described provides a one-handed latching and unlatching arrangement that allows for products with articulating sections to be configured into multiple predetermined different articulated positions quickly and safely. The features disclosed in this specification can be applied to any product where there is a requirement to lock and unlock articulated sections, this can include, but is not limited to—Multipurpose, Combination, Dual Purpose, Twin and Single "A" frame and step, leaning and straight step—ladder products.

Even though there has been a disclosure of preferred forms, the specific embodiments disclosed and illustrated herein are not to be considered in a limiting sense, because numerous variations are possible. Applicant regards the subject matter of this disclosure to include all novel and nonobvious combinations and sub-combinations of the various elements, features, functions, and properties disclosed herein. No single feature, function, element or property of the disclosed embodiments is essential. The following claims define certain combinations and sub-combinations of features, functions, elements, and properties that are regarded as novel and nonobvious. Other combinations and sub-combinations may be claimed through amendment of the present claims or presentation of new claims in this or a related application. Such claims, whether they are broader, narrower, equal, or different in scope to the original claims, also are regarded as included within the subject matter of applicants' disclosure.

The invention claimed is:

1. A ladder, comprising:
   a first ladder section and a second ladder section, each of the first ladder section and the second ladder section having first and second rails and at least one rung connecting the first and second rails; and
   a lockable pivot assembly connecting the first and second ladder sections and enabling selective rotation of the second ladder section relative to the first ladder section, the lockable pivot assembly including:
   an elongated housing connected to the first ladder section;
   a first plate connected to the first rail of the second ladder section and a second plate connected to the second rail of the second ladder section, the first plate pivotably coupled to a first end of the elongated housing and the second plate pivotably coupled to a second end of the elongated housing, the first plate and the second plate each defining a plurality of openings for locking the second ladder section relative to the first ladder section in a plurality of different positions, and wherein the first plate defines a base plate with a central hole for a pivot pin and an elongated stem for engaging a rail of the second ladder section, wherein a center of the elongated housing is generally aligned with the central hole of the base plate; and
   a lock assembly positioned at least in part within the elongated housing and comprising:
   a first locking member and a second locking member for engaging and disengaging the plurality of openings of the first plate and the second plate, respectively;
   a first actuator mechanically coupled to the first looking member and a second actuator mechanically coupled to the second locking member, the first actuator having a first handle and the second actuator having a second handle, the first handle and the second handle extending downwardly below the elongated housing;
   a biasing element biasing the first locking member and the first actuator away from the second locking member and the second actuator;
   wherein an unlocked state of the lockable pivot assembly is provided when the first and second actuators are moved towards each other and against the bias so that the first and second locking members disengage the plurality of openings of the first plate and the second plate to allow rotation of the second ladder section relative to the first ladder section, and
   a locked state of the lockable pivot assembly is provided when the first and second locking members engage at least one of the plurality of openings of the first plate and the second plate.

2. The ladder of claim 1, wherein a pivot pin extends through the first plate and into the elongated housing.

3. The ladder of claim 2, wherein the first and second locking members and the pivot pin are positioned at least in part within a cavity of the elongated housing.

4. The ladder of claim 1, wherein the elongated housing is fixed from rotation relative to the first ladder section.

5. The ladder of claim 1, wherein an elongated bracket is coupled to a side of the elongated housing.

6. The ladder of claim 1, wherein the first handle and the second handle when biased apart are positioned to allow for one-handed actuation.

7. The ladder of claim 1, including a pivot pin comprising a rod positioned between the first plate and the second plate.

8. The ladder of claim 1, further comprising a platform connected to the first and second ladder sections, and the ladder is positionable into a use state in which the first and second ladder sections are angled with respect to one another and the platform is in a substantially horizontal orientation, and into a folded state in which the first and second ladder sections and the platform are substantially parallel to each other.

9. A ladder, comprising:

a first ladder section and a second ladder section, each of the first ladder section and the second ladder section having first and second rails and at least one rung connecting the first and second rails; and a lockable pivot assembly connecting the first and second ladder sections and enabling selective rotation of the second ladder section relative to the first ladder section, the lockable pivot assembly including:

an elongated housing connected to the first ladder section and having a first cavity;

a first plate connected to the first rail of the second ladder section and a second plate connected to the second rail of the second ladder section, the first plate pivotably coupled to a first end of the elongated housing and the second plate pivotably coupled to a second end of the elongated housing, wherein a pivot pin extends through the first plate and into the first cavity of the elongated housing and wherein the first plate and the second plate each define a plurality of openings for locking the second ladder section relative to the first ladder section in a plurality of different positions; and a lock assembly positioned at least in part within the elongated housing and comprising:

a first locking member and a second locking member extending at least in part within the first cavity for engaging and disengaging the plurality of openings of the first plate and the second plate, respectively.

10. The ladder of claim 9, wherein the pivot pin extends into a central portion of the elongated housing.

11. The ladder of claim 9, wherein the first plate defines a base plate with a central hole for the pivot pin and an elongated stem for engaging a rail of the second ladder section.

12. The ladder of claim 11, wherein the elongated housing is aligned with a center of the base plate.

13. The ladder of claim 9, wherein the elongated housing is fixed from rotation relative to the first ladder section.

14. The ladder of claim 9, wherein the first locking member is mechanically coupled to a first handle and the second locking member is mechanically coupled to a second handle, the first handle and the second handle extending downwardly below the elongated housing.

15. The ladder of claim 9, wherein an elongated bracket is coupled to a side of the elongated housing.

16. The ladder of claim 9, wherein the first locking member is mechanically coupled to a first handle and the second locking member is mechanically coupled to a second handle, the first handle and the second handle positioned to allow for one-handed actuation to engage and disengage the first locking member and the second locking member in the plurality of openings of the first plate and the second plate.

17. The ladder of claim 9, wherein the pivot pin extends between the first plate and the second plate.

18. The ladder of claim 9, further comprising a platform connected to the first and second ladder sections, and the ladder is positionable into a use state in which the first and second ladder sections are angled with respect to one another and the platform is in a substantially horizontal orientation, and into a folded state in which the first and second ladder sections and the platform are substantially parallel to each other.

\* \* \* \* \*